Jan. 27, 1925.

S. C. KNIGHT 1,524,038

GARDEN RULE

Filed March 10, 1922

INVENTOR
STANLEY COLDHAM KNIGHT
PER
ATTORNEYS.

Patented Jan. 27, 1925.

1,524,038

UNITED STATES PATENT OFFICE.

STANLEY COLDHAM KNIGHT, OF CANTERBURY, ENGLAND.

GARDEN RULE.

Application filed March 10, 1922. Serial No. 542,683.

*To all whom it may concern:*

Be it known that I, STANLEY COLDHAM KNIGHT, subject of the King of Great Britain and Ireland, and resident of Great Weddington, Ash, Canterbury, in the county of Kent, England, have invented certain new and useful Improvements in Garden Rules, of which the following is a specification.

My invention relates to an improved garden rule for use in spacing or laying out rows of plants, seeds and the like in gardens so as to enable the adoption of a method of sowing and planting vegetables and other seeds to the best advantage.

According to this invention I employ a rule of hard wood or other suitable substance of the desired length. This rule is rectangular in section and has a depth somewhat greater than its width. The rule is divided into a series of special divisions which I propose to call units by means of a series of transverse cuts or grooves on the upper surface of the rule. Each unit is also divided into quarters by means of three narrower and shallower transverse grooves correctly spaced. The selected dimension of the unit has been arrived at as the result of many years of experience in the sowing and laying out of plants and seeds of vegetables or the like. This dimension is one unit and equals 11¼ inches, thus each ¼ unit will measure 2¹³⁄₁₆ inches.

The transverse grooves are formed on the upper narrower edge of the rule and the grooves marking each whole unit may be about ¹⁄₁₀ of an inch wide and about ¼ of an inch deep and the dimensions marking the ¼ unit may conveniently be about ¹⁄₂₀ of an inch wide by ⅛ of an inch deep. These transverse grooves may be conveniently used for spacing the strings or cords which are usually employed in laying out rows of plants, the zero end of the rule being placed against one row of plants and the string or cord engaged in the transverse groove marking the division, which will give the correct spacing for the type of plant. If desired these grooves may be made slightly tapered from top to bottom so that the cord or string may be wedged therein so as to hold it in place whilst being used.

In order that my invention may be more readily understood reference is had to the accompanying drawing in which:—

Figure 1:
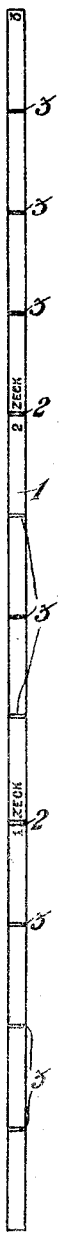
Figure 1 is a plan.
Figure 2:
Figure 2 is a side elevation of a garden rule according to my invention.

Referring to the drawings the rule 1 comprises a strip of hard wood such as teak, oak or the like of a length of three units, that is, 33¾ inches long. The rule is divided into three divisions representing one unit each by means of the transverse grooves, 2, cut in its upper edge and duly marked 1 unit, 2 units, and 3 units. Each whole division of one unit is divided into quarter units by means of narrower transverse grooves 3 correctly spaced.

Figure 3:
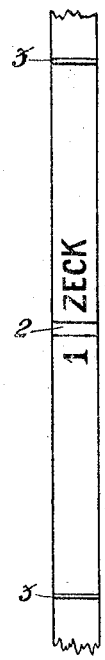
Figures 3 and 4 are respectively a plan and a side elevation of a short section of rule to an enlarged scale showing the transverse grooves in detail.
Figure 4:
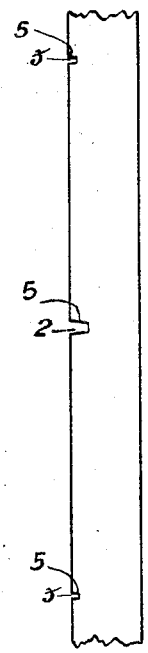

In Figures 3 and 4 the grooves 2 and 3 for marking the whole unit and quarter units are shown in greater detail to an enlarged scale and it will be seen that the grooves 2 marking the whole unit divisions are about ¹⁄₁₀ of an inch wide by ¼ of an inch deep, whilst the grooves marking the quarter units are about ¹⁄₂₀ of an inch wide by ⅛ of an inch deep. This arrangement enables the whole unit divisions to be readily distinguished from the quarter unit divisions and the method of marking these divisions by means of transverse grooves enables the string or cord generally used for laying out rows of plants to be inserted in the correct groove so as to space the row of plants the correct distance from the adjacent row against the zero end of the rule.

The grooves 2 and 3 are shown in Figure 4 with tapering sides 5 so as to facilitate the wedging of strings therein.

I claim:—

A garden rule for spacing both rows and individual plants and comprising a length of hard wood of rectangular cross section having a number of transverse grooves upon one surface, said grooves being spaced 2¹³⁄₁₆ inches apart, every fourth groove being wider than the three preceding grooves, the sides of said grooves tapering from top to bottom, said grooves being deeper than their width, extending completely across the length of the wood and having sides between which strings can be wedged.

STANLEY COLDHAM KNIGHT.